United States Patent
De Roucy et al.

(10) Patent No.: US 8,520,523 B2
(45) Date of Patent: Aug. 27, 2013

(54) DEVICES AND METHODS FOR MANAGING QUALITY OF SERVICE FOR BEARERS DEPENDING ON UTILIZATION

(75) Inventors: Maxime De Roucy, Montreal (CA); Yves Lemieux, Kirkland (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/025,739

(22) Filed: Feb. 11, 2011

(65) Prior Publication Data
US 2012/0320743 A1   Dec. 20, 2012

(51) Int. Cl.
*H04W 28/10*   (2009.01)

(52) U.S. Cl.
USPC ........................................ 370/235; 370/238

(58) Field of Classification Search
None
See application file for complete search history.

(56) References Cited

U.S. PATENT DOCUMENTS

| | | | |
|---|---|---|---|
| 6,850,491 B1 * | 2/2005 | Firoiu et al. | 370/235 |
| 7,145,876 B2 * | 12/2006 | Huang et al. | 370/232 |
| 7,499,453 B2 | 3/2009 | Carlson et al. | |
| 7,747,255 B2 * | 6/2010 | Dacosta et al. | 455/452.2 |
| 7,801,995 B2 | 9/2010 | Lake et al. | |
| 7,822,064 B2 | 10/2010 | Thubert et al. | |
| 7,965,640 B2 * | 6/2011 | Harada et al. | 370/236 |
| 8,345,545 B2 * | 1/2013 | Kokku et al. | 370/229 |
| 2002/0089930 A1 * | 7/2002 | Aceves et al. | 370/230 |
| 2004/0151117 A1 * | 8/2004 | Charcranoon | 370/235 |
| 2005/0163048 A1 * | 7/2005 | Arora et al. | 370/230 |
| 2005/0220035 A1 | 10/2005 | Ling et al. | |
| 2007/0071030 A1 * | 3/2007 | Lee | 370/468 |
| 2007/0086529 A1 * | 4/2007 | Krishnasawamy et al. | 375/241 |
| 2007/0097257 A1 * | 5/2007 | El-Maleh et al. | 348/419.1 |
| 2007/0206552 A1 | 9/2007 | Yaqub et al. | |
| 2007/0286213 A1 | 12/2007 | Fodor et al. | |
| 2008/0080414 A1 | 4/2008 | Thubert et al. | |
| 2008/0232405 A1 * | 9/2008 | Gallo | 370/498 |
| 2009/0141650 A1 | 6/2009 | Balan et al. | |
| 2009/0196180 A1 * | 8/2009 | Bahl et al. | 370/235 |
| 2010/0098047 A1 * | 4/2010 | Zhou et al. | 370/345 |
| 2010/0142397 A1 | 6/2010 | Arye | |
| 2010/0195503 A1 | 8/2010 | Raleigh | |
| 2012/0106337 A1 * | 5/2012 | Salonidis et al. | 370/233 |

FOREIGN PATENT DOCUMENTS

WO   2005057866 A1   6/2005

OTHER PUBLICATIONS

Jose-Javier Pastor Balbas, et al., Policy and Charging Control in the Evolved Packet System, IEEE Communications Magazine, Feb. 2009, pp. 68-74.

(Continued)

*Primary Examiner* — Bunjob Jaroenchonwanit
(74) *Attorney, Agent, or Firm* — Alex Nicolaescu; Ericsson Canada Inc.

(57) ABSTRACT

Methods and devices used for a dynamic QoS management taking into consideration a global throughput and individual bearer throughputs are provided. The global throughput and individual bearer throughputs may be predicted upon receiving each packet from a public domain network. Individually, for each bearer is determined if a current QoS service is adequate by comparing the global throughput with threshold values associated to the bearer and on evaluating whether the bearer is overloaded. If the current QoS level associated with the bearer is not adequate, the QoS level associated with the bearer is set to another QoS level.

21 Claims, 7 Drawing Sheets

(56) References Cited

OTHER PUBLICATIONS

Jukka Tuominen, Develpoment of Test Case Library for Service Aware Charging and Control, Faculty of Technology and Maritime Management Pori, Information Technology, Aug. 2009, pp. 01-41 and pp. 01-13.

ETSI TS 129 212 V9.3.0,Universal Mobile telecommunications System (UMTS) ;LTE;Policy and charging control over Gx reference point (3GPP TS 29.212 version 9.3.0 Release 9),Jun. 2010, pp. 01-117.

PCT Search Report from corresponding application PCT/IB2012/050617.

Bharat Mota,Quality of Service in LTE Wireless Backhaul Applications with VortiQa Software for Service Provider Equipment,FTF_NET-F0786, Freescale Semiconductor, Jun. 2010, pp. 01-28.

Hannes Ekstrom, QoS Control in the 3GPP Evolved Packet System,LTE-3GPP Release 8,IEEE Communications Magazine, Feb. 2009, pp. 76-83.

\* cited by examiner

DEVICES AND METHODS FOR MANAGING QUALITY OF SERVICE FOR BEARERS DEPENDING ON UTILIZATION

TECHNICAL FIELD

The present invention generally relates to systems, devices and methods for dynamically adjusting the quality of service of individual bearers depending on an estimated future utilization based on a global throughput and individual bearer throughputs.

BACKGROUND

Worldwide, the third generation (3G) of mobile telecommunication networks is replaced by a fourth (4G) generation. The 3GPP Evolved Packet System (EPS) is a mobile network technology developed by the 3rd Generation Partnership Project (3GPP, a name trademarked by one of the associations within the partnership, the European Telecommunications Standards Institute), to effectuate this transition to 4G communication networks in an effective manner, by using agreed upon standards and definitions. Within EPS, Long Term Evolution (LTE) mainly refers to the technology employed between a user (UE) and a base station (eNodeB), and Evolved Packet Core (EPC) technology mainly refers to the transport network employed to provide support to enhanced multimedia services on top of EPS. LTE systems have a higher spectral efficiency, a lower latency, and the EPS systems have a simpler architecture, than the 3G systems and provide a variable bandwidth capability. Between base stations and a public domain network in an EPS system, there are a group of central nodes (defined by the System Architecture Evolution—SAE working group and known as EPC) defined in 3GPP 23-401 and 3GPP 23-402, whose most recent versions as of January 2011 are also incorporated herewith by reference.

FIG. 1 is a schematic view of a conventional EPS system 100, in which a user 109 connected to a base station (eNodeB) 110 receives multimedia services from a Public Domain Network 140 via a serving gateway (SGW) 120 and a public domain network gateway (PDN GW) 130. A link 115 having a backhaul IP (and maybe also Ethernet or other type of) functionality, operates between the base station and the SGW 120. A link 125 having a service and mobile aware All-IP network functionality operates between the SGW 120 and the PDN GW 130. One significant enhancement brought by UMTS access which is the superset to LTE technology is the end-to-end QoS based on logical links named bearers identifying packet flows receiving common QoS treatment between a user (e.g., 109) and a PDN GW (e.g., 130). The bearers may be guaranteed bit rate (GBR) bearers or non-GBR bearers. There is also the default bearer which is basically a non-GBR bearer that comes with an AMBR (Aggregate Maximum Bit Rate) to limit the Bandwidth of all the non-GBR bearers. The QoS treatment of a bearer may be predefined as a QoS class identifier (QCI), the QCI being an index that differentiates based on whether the bearer is a GBR or non-GBR bearer and other artifacts such QoS parameters (delay, jitter, bandwidth etc) (GBR, QCI and ARP are the parameters that complement each other to specify the QoS).

In order to manage the Quality of Service (QoS) provided to all the users and to each user depending on his service profile, the central nodes perform a policy charging rules function (PCRF), which aggregates information to and from the network, operational support systems, and other sources (such as portals) in real time, supporting the creation of rules based on which automatically makes intelligent policy decisions for each subscriber active on the network. The PCRF enables the network to operate multiple services at different quality of service (QoS) levels. Complementary to the PCRF, central nodes such as S-GW (as per TS23.402) and PDN-GW (in both TS23.401 and TS23.402) also perform a policy charging enforcement function (PCEF) which is responsible with enforcing the policy rules generated by the PCRF. The PCRF and PCEF may be software components hosted by network devices or standalone nodes, located between base stations (e.g., eNodeB) serving user stations, and the public data network (PDN). The PCRF and PCEF allow a dynamic QoS management.

Certain limitations regarding QoS management have already occurred in the existing EPS systems. Specifically, the conventional EPS systems do not clearly specify how to perform dynamic QoS management taking into consideration the individual bearer load (e.g., predicted throughput/allocated throughput) and the global network congestion (e.g., the ratio of current throughput over the maximum possible throughput). For example, if the overall network is not overloaded and a bearer has reached its limit (i.e., fully uses its allocated throughput), the current EPS systems are not specified in the 3GPP technical specification on when to increase the bearer's QoS level (i.e., allocate resources for more throughput to the bearer), which increase would enhance the experience of the user served via the bearer. Conversely, when the overall network is overloaded, the current EPS systems are not specifically habilitated to (as it is desirable) selectively adjust the QoS levels (i.e., decrease the QoS level of some bearers, but not of all the bearers). It would be desirable when a network congestion is predicted or observed, to lower the QoS level of bearers serving user equipment (UEs) that signed (according to their profile) for lesser service, while maintaining the QoS level of bearers serving UEs that signed (according to their profile) for better service.

Accordingly, it would be desirable to provide devices, systems and methods capable of a dynamic bearer QoS management based on predicted global and individual throughputs and taking into consideration user profiles.

SUMMARY

Some embodiments overcome current limitations of quality of service management in a communication system in which bearers transporting subsets of packets at a specified quality of service (QoS) level, by adjusting QoS levels of bearers individually taking into consideration the predicted global throughput and the bearer predicted throughput.

According to one exemplary embodiment, a module for predicting global and individual bearer throughputs, a bearer transporting a subset of packets at a specified quality of service level between a public domain network and a user, includes at least one interface and a processing unit. The at least one interface is configured to intercept packets transmitted between a public domain network and a plurality of users, and to output a global predicted throughput and bearer predicted throughputs. The processing unit is configured to extract a packet size and an identity of a bearer that is used to transport each received packet, to predict a global throughput using the packet size, and to evaluate individually the bearer predicted throughputs by inputting the packet size to an individual throughput module among a plurality of individual throughput modules according to the identity of the bearer.

According to another exemplary embodiment, a method of dynamically adjusting QoS levels for bearers in a communication system configured to enable users to communicate with a public domain network (PDN), each bearer transporting a subset of packets transmitted from the PDN to users at a specified quality of service (QoS) level among a plurality of QoS levels is provided. The method includes receiving a global throughput and bearer throughputs corresponding to the bearers. The method further includes individually, for each bearer, determining whether a QoS level associated with the bearer is adequate by comparing the global throughput with threshold values associated to the bearer and on evaluating whether the bearer is overloaded. The method also includes setting the QoS level associated with the bearer to another level among the plurality of QoS levels, when the determining indicates that the QoS level associated with the bearer is not adequate.

According to another exemplary embodiment, a network node configured to dynamically adjust QoS levels for bearers, each bearer transporting a subset of packets transmitted from a public domain network to users, at a specified quality of service (QoS) level among a plurality of quality of service levels includes at least one interface and a processing unit. The at least one interface is configured to receive a global throughput and bearer throughputs, to retrieve specified QoS levels for bearers and to output the specified QoS levels for the bearers. The processing unit is configured to perform individually, for each bearer, (i) determining whether a specified QoS level of the bearer is adequate by comparing the global throughput with threshold values associated to the bearer and on evaluating whether the bearer is overloaded, and (ii) setting the specified QoS level associated with the bearer to another level among the plurality of QoS levels if when the determining indicates that the specified QoS level associated with the bearer is not adequate.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a communication system enabling access of a mobile station (UE) to a public data network (PDN). However, the embodiments to be discussed next are not limited to these systems but may be applied to other systems in which data flows transmitted via a same physical path are managed as bearers, that is, end-to-end logical links having the same quality of service (QoS).

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

Figure 1:
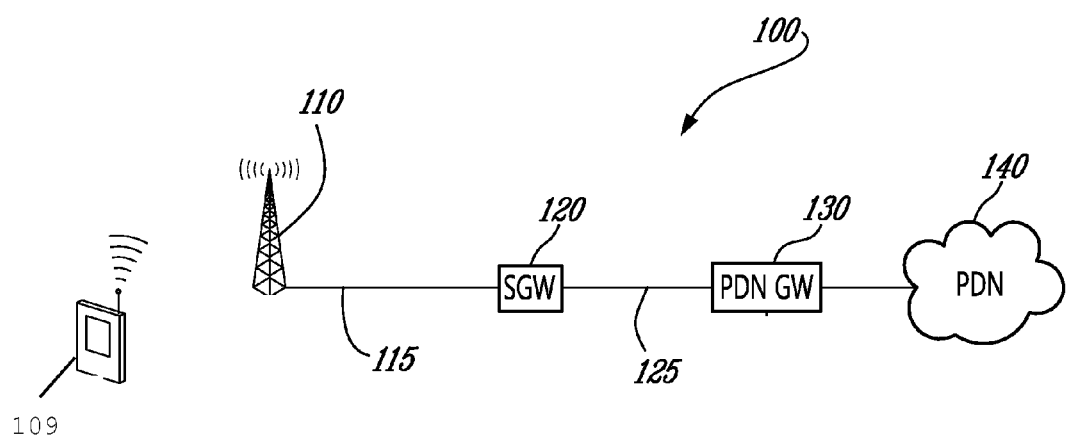
FIG. 1 is a schematic diagram of a conventional EPS system.
Figure 2:
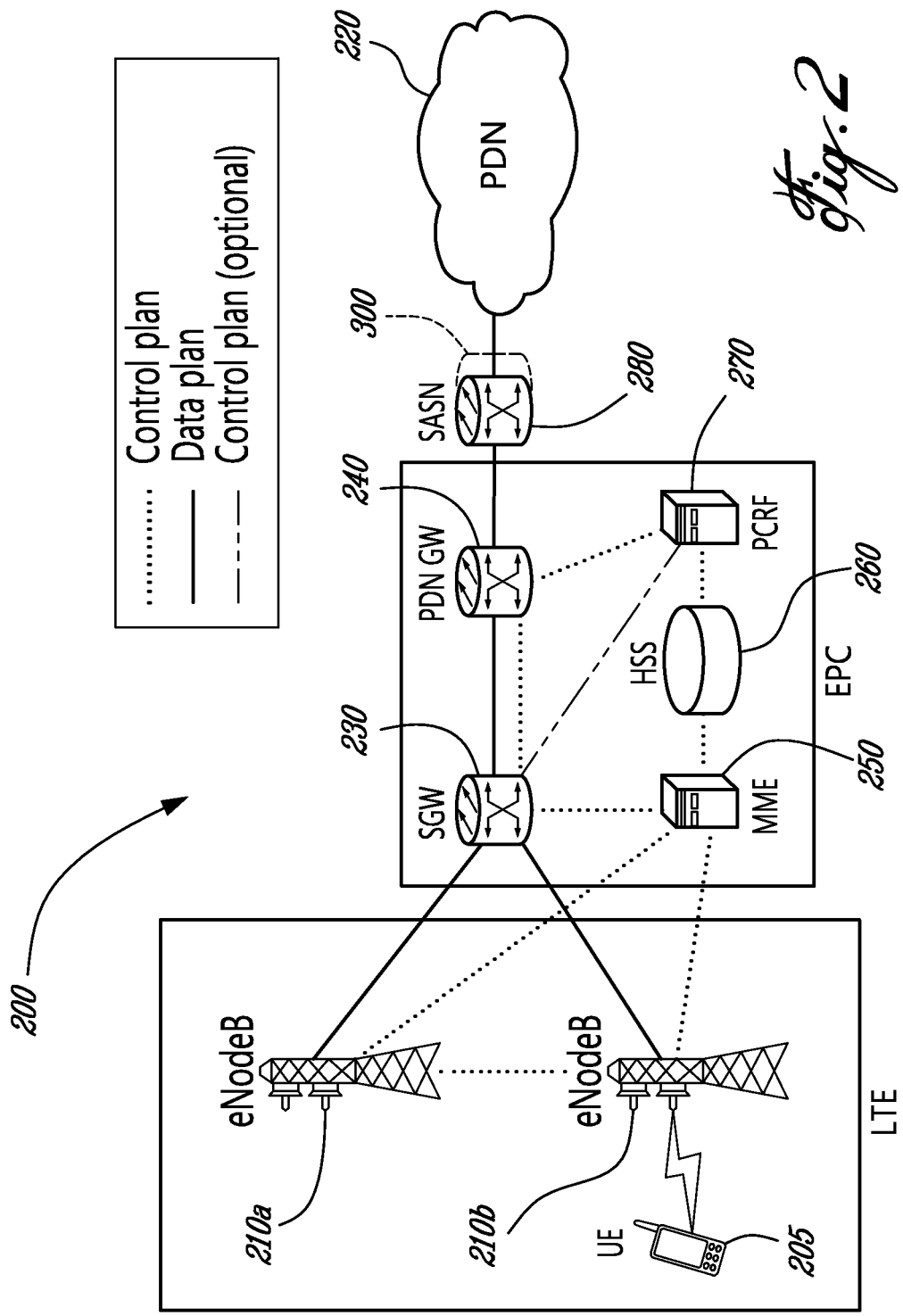
FIG. 2 is a schematic diagram of a communication system according to an exemplary embodiment.

For purposes of illustration and not of limitation, FIG. 2 illustrates a communication system 200 meeting the characteristics defined by the January 2011 standard versions of 3GPP. Network devices in the communication system 200 are (in addition to having these characteristics) configured to perform methods for dynamically adjusting the quality of service (QoS) level for bearers individually depending on a global predicted throughput (i.e., the throughput of the overall traffic, all the bearers) and the bearer predicted throughput.

In the system 200, a plurality of user stations (UE) 205 (only one being illustrated) may actively communicate via base stations (eNodeB) 210a and 210b with a public data network (PDN) 220, such as, the Internet. Central nodes located between the base stations 210a and 210b and the PDN 220 include a Serving Gateway (SGW) 230, a Public Data Network Gateway (PDN GW) 240, a Mobility Management Entity (MME) 250, a Home Subscriber Server (HSS) 260 and a policy charging rules function (PCRF) 270. These central nodes have the functionality described in versions of 3GPP documents of January 2011 (documents which are incorporated herewith by reference) and may be hardware, software, firmware or a combination of thereof. The central nodes are employed in management of packet based data communication in the network 200. Additionally, between the PDN GW 240 and the PDN 220 there is a Service Aware Support Node (SASN) 280 as described in "QOS CONTROL" DOC#3/221 02-AXB 250 60/5 UEN REV B, which is incorporated herewith by reference.

The communication among the network devices in the system 200 can be viewed, based on its content, as being part of a data plane (the continuous lines) or of a control plane (the dotted lines). A communication in the control plane (absent TS23-401 but present in TS23-402) may exist between the PCRF 270 and the SGW 230 (the dashed line).

In the system 200, data communication may be managed as encompassing plural GTP bearers between the base stations 210a and 210b and SGW 230 to the PDN GW 240 (according to 3GPP TS23.401) or encompassing PMIP/GRE tunnels between SGW 230 and PDN GW 240 (according to 3GPP TS 23.402). Hereinafter, a general term "bearer" is used regardless of the specific manner of implementing the end-to-end communication.

The communication system 200 includes at least one module 300 capable to detect and/or predict congestion in the data plane. The module 300 may be incorporated, for example, in the SASN 280, or in the PDN GW 240, or may be a standalone combination of hardware, firmware and software. The module 300 is located and configured to intercept any packet transmitted between the PDN 220 and base stations 210*a* and 210*b*, that is, packets pertaining to all the bearers.

Figure 3:
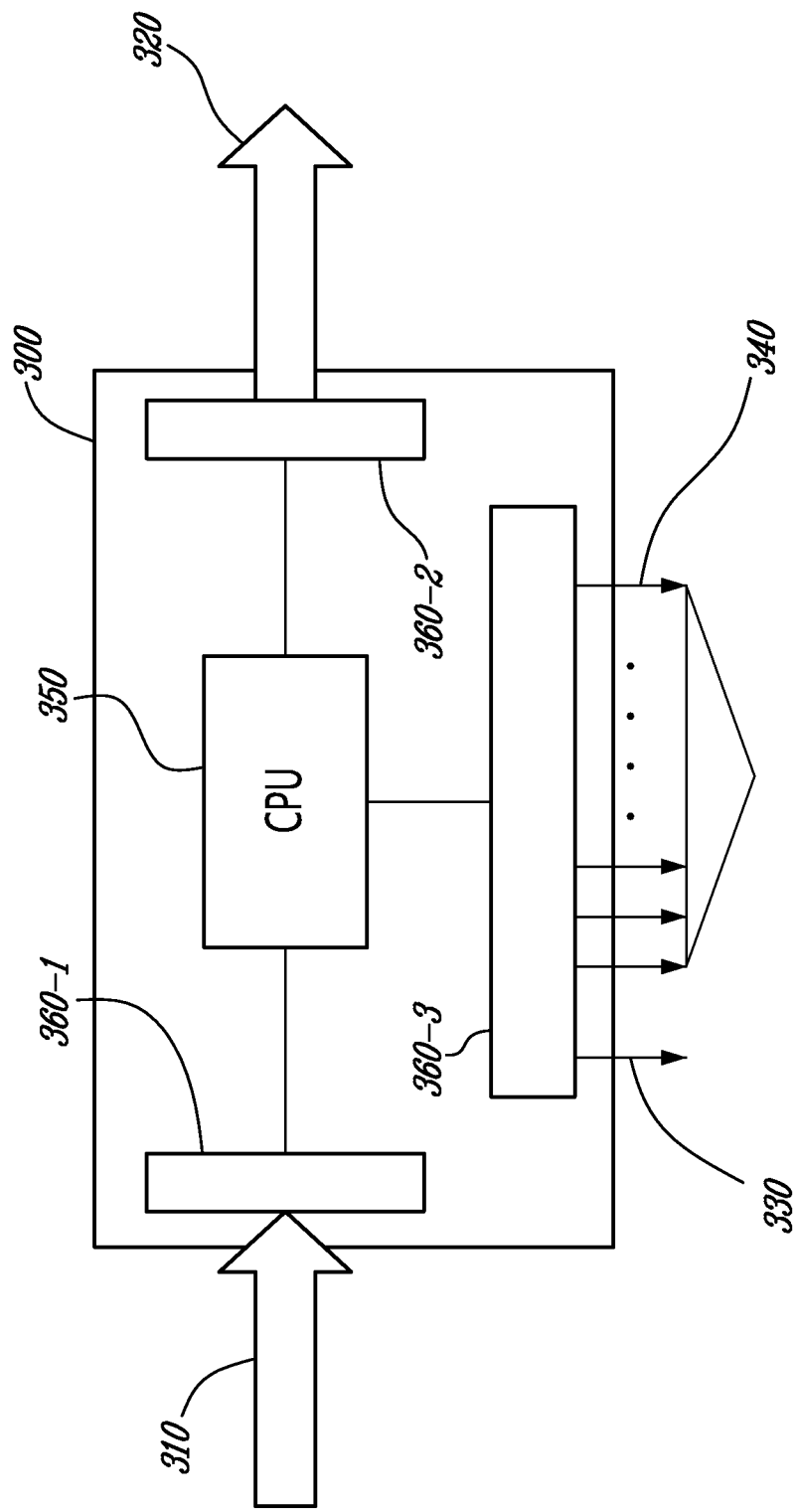
FIG. 3 is a schematic diagram of a module for predicting total throughput and individual bearers throughputs according to an exemplary embodiment.

FIG. 3 illustrates a module to predict total throughput and individual bearers throughputs according to an exemplary embodiment. The module 300 receives, as an input 310, the intercepted packets and outputs (1) the packets towards the bearers as a first output 320, in the data plane, and (2) a global predicted throughput 330 and bearer predicted throughputs individually for each of bearers, as second outputs 340, in the control plane. Thus, the throughputs 330 and 340 provide global/individual metric/counter reports on the control plane Regardless whether the module 300 is incorporated into SASN 280, the PDN GW 240 or is a standalone device, the module 300 requires an underlying processor 350 and one or more (here illustrated as distinct, but not limited thereof) interfaces 360_1, 360_2 and 360_3 with other network devices in the data plane (i.e., 360_1 and 360_2) and in the control plane (i.e., 360_3).

Figure 4:
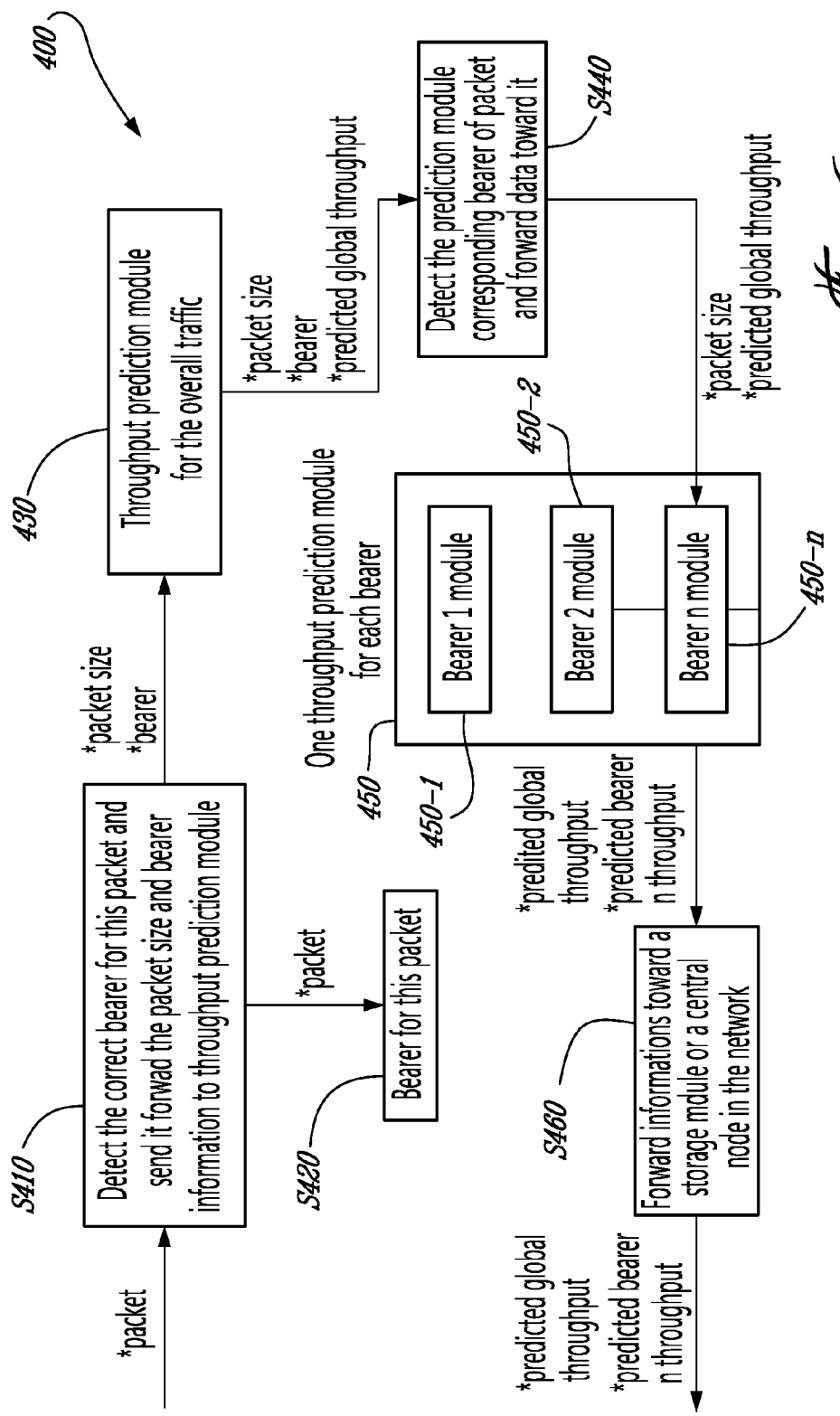
FIG. 4 is a flow diagram of a method executed in a module for predicting total throughput and individual bearers throughputs according to an exemplary embodiment.

FIG. 4 is a flow diagram of a method 400, which may be performed in the module 300. First, at S410, upon receiving a packet, the module 300 parses the received packet to detect (i.e., identity) a bearer among a plurality of current bearers that is used to transmit the received packet. For example, the bearer may be identified based on the destination user equipment specified in a header of the packet. The packet is then forwarded towards the bearer, at S420, for example, as the first output 320, while information related to the packet size and the identity of the bearer is retained to perform the throughput predictions. If the module 300 is hosted in the PDN GW 240, the packet is sent to the bearer. However, if the module 300 is hosted in the SASN 280 or is a standalone device located between the PDN GW 240 and the PDN 220, the packet is output to be later channeled through the bearer.

The information related to the packet size and the identity of the bearer is then input to a throughput prediction module 430 configured to predict a global (over all the bearers) traffic. The throughput prediction module 430 outputs the information together with a global predicted throughput. At S440, a prediction module (e.g., 450_*n*) which is part of an array of prediction modules 450 (each prediction module corresponding to a bearer) is selected based on the identity of the bearer. The packet size and the global predicted throughput are then input to the selected prediction module (e.g., 450_*n*). The prediction module 450_*n* is configured to output a bearer predicted throughput for the corresponding bearer. At S460, the global predicted throughput and the bearer predicted throughput are forwarded towards a storage module or a central node.

Based on the stored predicted throughputs (i.e., the global predicted throughput and the predicted throughputs for each bearer), the module 300 or the central node storing the predicted throughputs may periodically generate an aggregated report which is sent, for example, to the PCRF 270 or to other central node in charge to dynamically adjust QoS level for bearers. The module 300 or the central node storing the predicted throughputs may generate and send the aggregated report when the global predicted throughput reaches a predetermined threshold, which indicates potential congestion that has to be prevented.

The use of a module like 300 provides the advantage of detection/prediction of congestion at global level and at each and every bearer correlated with the allocated throughput utilization.

Figure 5:
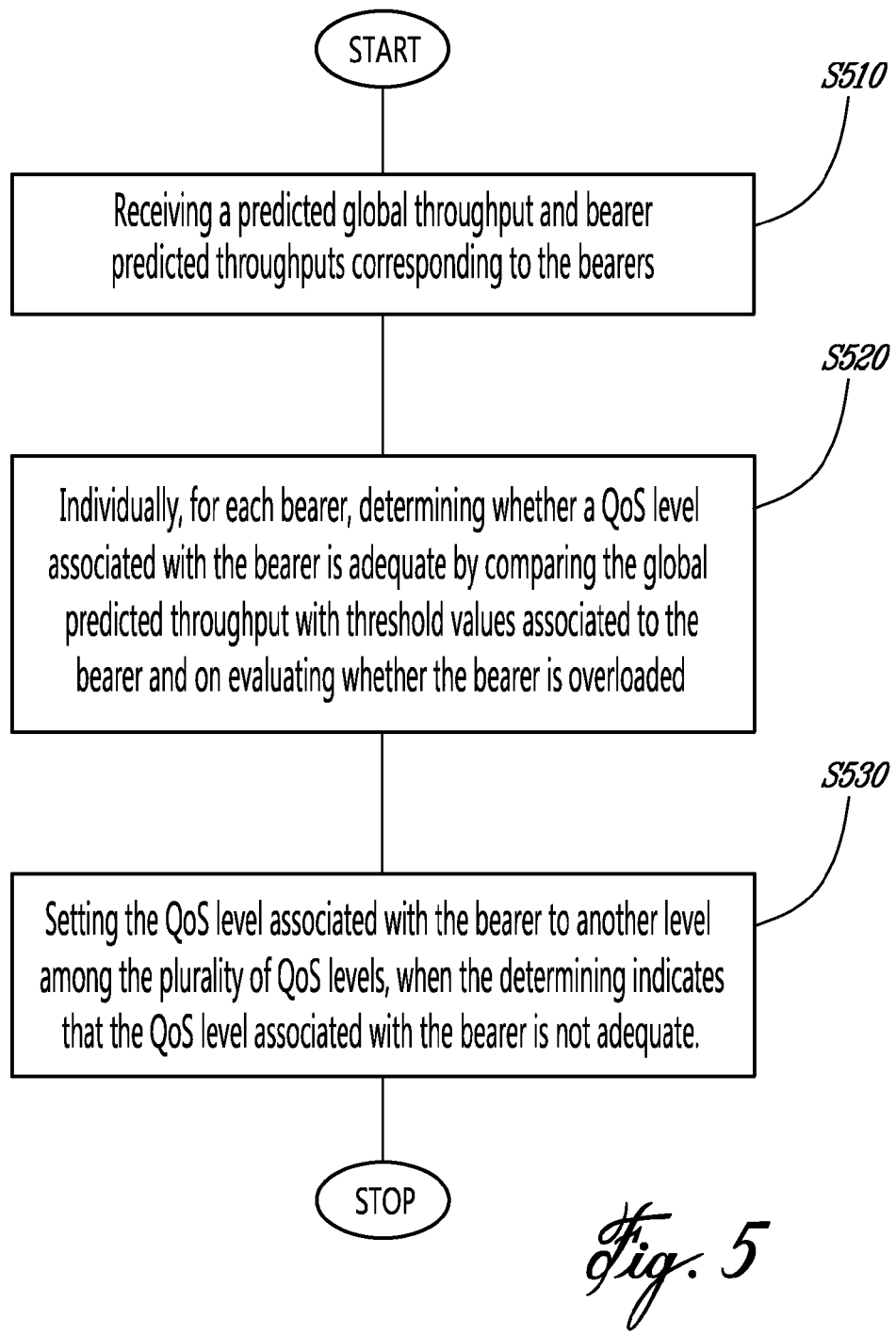
FIG. 5 is a flow diagram of a method for dynamically adjust QoS levels for bearers according to an exemplary embodiment.

The PCRF 270 or other central node in charge to dynamically adjust QoS levels for bearers may perform a method 500 as illustrated in FIG. 5. At S510, the method 500 includes receiving a predicted (or measured) global throughput and predicted (or measured) throughputs corresponding to the bearers. The predicted global throughput and predicted throughputs corresponding to the bearers may be received as an aggregated report periodically or when a network congestion is predicted.

At S520, the method 500 includes lowering the specified QoS level for at least some of the bearers, when the global predicted throughput exceeds a predetermined high value. At S530, the method 500 includes raising the specified QoS level for at least some of the bearers, when the global predicted throughput is lower than a predetermined low value. The method 500 may further include selecting the bearers for which to lower or for which to raise the specified QoS based on a service profile of a user at the end of the bearer.

For example, without limiting to this number or type of QoS levels, the plurality of QoS levels may include a high level, a default level and a low level. The default level may be the specified QoS level for a newly created bearer, depending on the profile of the user at the end of the bearer and of the requested service, considering that the network is not congested. The high level may correspond to an increased throughput assigned to the bearer, when the network is not overloaded and the bearer is predicted to need more than his allocated throughput. The low level may correspond to a decreased throughput assigned to the bearer when the network is overloaded, that is, a network congestion is predicted or detected.

The exact meaning associated with these levels may vary from bearer to bearer, depending on a profile of the UE at the end of the bearer (profile which may be stored in the HSS 260), and the type of bearer.

Figure 6:
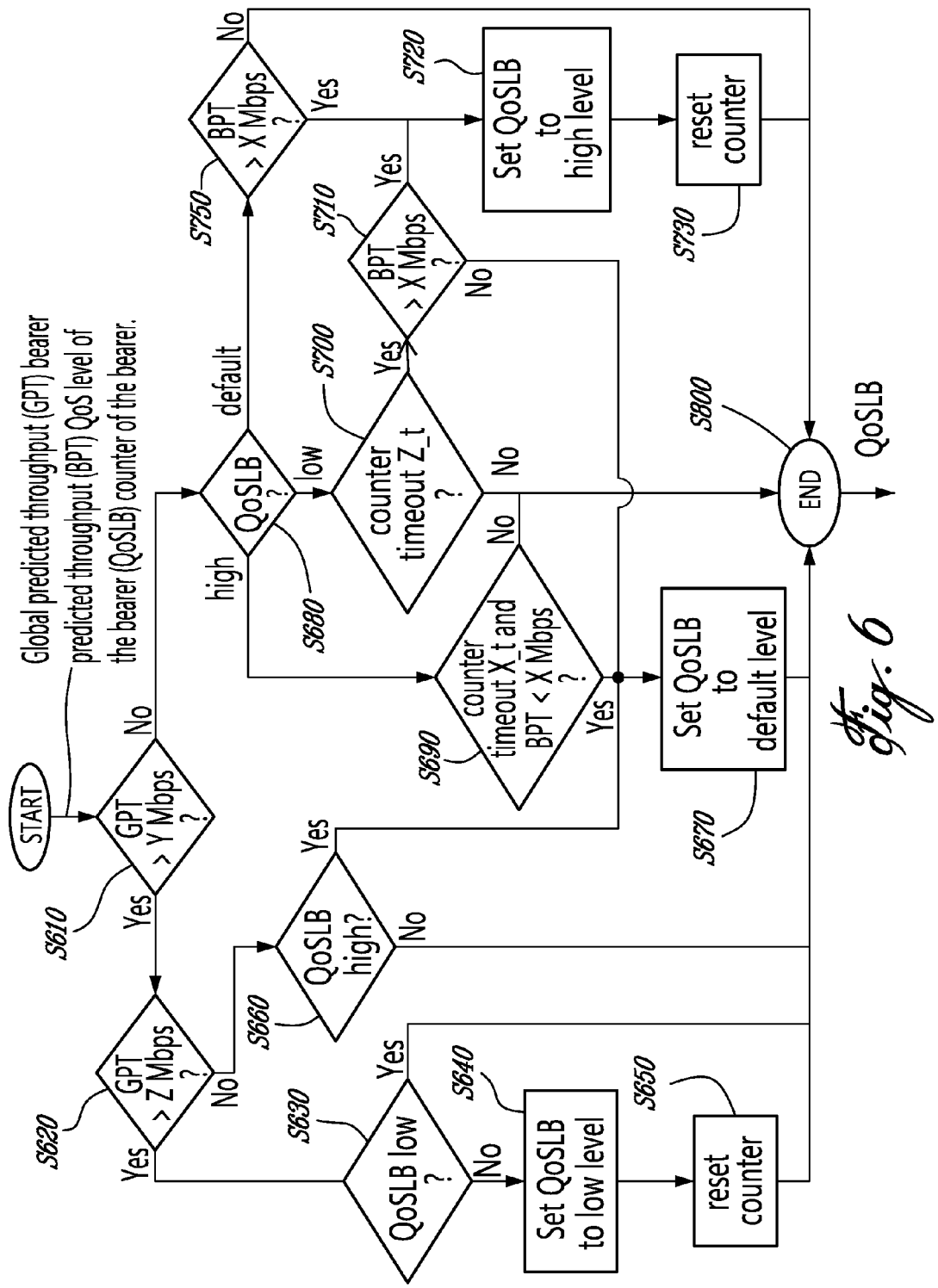
FIG. 6 is a logical diagram illustrating a procedure used to adjust a QoS level of a bearer according to an exemplary embodiment.

FIG. 6 is a logical diagram illustrating a procedure which is an exemplary embodiment of implementing S520 and S530 of the method 500. The procedure, which is executed for each bearer, receives as inputs: the predicted global throughput, the bearer predicted throughput, a counter associated with the bearer and a value of the QoS level for the bearer (i.e., an initial current value). The procedure outputs the QoS level for the bearer, which may have been changed during the procedure. In another embodiment a measured throughput may be considered besides a predicted throughput.

First, at S610, the global predicted throughput is compared with the predetermined low value (Y Mbps). If the global predicted throughput is larger than the predetermined low value ("YES" branch after S610), the global predicted throughput is then compared with the predetermined high value (Z Mbps), at S620. If the global predicted throughput is larger than the predetermined high value ("YES" branch after S620), a network congestion is likely, and, therefore, the QoS level of the bearer is set to the low level (if not already at the low level) in order to decrease the likelihood of the congestion. Thus, at S630, it is determined whether the QoS level is already a low level (and thus cannot be lowered). If the QoS level is already the low level ("YES" branch after S630), the procedure executed for this bearer ends at S800, the QoS level for the bearer being the low level.

If, at S630, it is determined that the QoS level is not the low level ("NO" branch after S630), at S640, the QoS level for the bearer is set to the low level, and at 650, the counter associated with the bearer is reset. The counter is configured to measure time and increases continuously with a predetermined frequency. The module 300 as a standalone device or another network device hosting the module 300 includes a plurality of counters associated with the bearers.

If, at S620, it is determined that the global predicted throughput is lower than the predetermined low value ("NO" branch after S620), then, at S660, it is determined whether the QoS level is the high level. If the QoS level is not the high level ("NO" branch after S660), the procedure executed for this bearer ends at S800, the QoS level of the bearer remaining at the low level or at the default level, that is, the same value as at the beginning of the procedure.

If the QoS level is the high level ("YES" branch after S660), the QoS level is set at the default level, at S670, and, then, the procedure ends at S800, the QoS level being the default level.

If, at S610, it is determined that the global predicted throughput is lower than the predetermined low value ("NO" branch after S610), the QoS level of the bearer may be increased. Then, at S680, the QoS level is identified.

If the QoS level is the high level ("HIGH" branch after S680), at 690, the counter is compared with a predetermined threshold associated with the high level, timeout_X, and the bearer predicted throughput is compared with a threshold, X Mbps. Then, if the bearer predicted throughput is lower than the threshold X Mbps, and the bearer counter larger than the predetermined threshold timeout_X, ("YES" branch after S690), the QoS level is set at the default level, at S670. Otherwise ("NO" branch after S690), the procedure ends at S800, the QoS level being the high level.

Further, if the QoS level is the low level ("LOW" branch after S680), at 700, the counter is compared with a predetermined threshold associated with the low level, timeout_Z. If, the counter has exceeded the threshold timeout_Z ("YES" branch after S700), the QoS level is going to be set at the default level or at the high level. Otherwise, ("NO" branch after S700), the procedure ends at S800, the QoS level for the bearer remaining the low level.

In order to determine at which level to increase the QoS level, at S710, the bearer predicted throughput is compared with the threshold X Mbps. If the bearer predicted throughput is larger than the threshold X Mbps ("YES" branch after S710), the QoS level is set at the high level, at S720, and the counter is reset at S730. After S730, the procedure ends at S800, the QoS level for the bearer being the high level. If the bearer predicted throughput is not larger than the threshold X Mbps ("NO" branch after S710), the QoS level is set at the default level, at S670. After S670, the procedure ends at S800, the QoS level for the bearer being the default level.

Finally, if the QoS level is the low level ("DEFAULT" branch after S680), at S750, the bearer predicted throughput is compared with the threshold X Mbps. If the bearer predicted throughput is larger than the threshold X Mbps ("YES" branch after S750), the QoS level is set at the high level, at S720, and the counter is reset at S730. After S730, the procedure ends at S800, the QoS level for the bearer being the high level. If bearer predicted throughput is not larger than the threshold X Mbps ("NO" branch after S750), the QoS level remains at the default level, and the procedure ends at S800, the QoS level for the bearer being the default level.

In other words, the procedure, which is run for each of the bearers, selectively considers changing an initial (i.e., current) value of the QoS level for the bearer based on the global predicted throughput and the bearer predicted throughput. Using the counter, the procedure has built in protections to switching the QoS level between the default level and the high level or the low level, each time the procedure is executed for the bearer (switching like a "yo-yo"). The high or the low level is maintained for predetermined respective time intervals (until the counter exceeds the predetermined value timeout X_T or timeout Z_T). Additionally, whether the switching of the QoS level for the bearer to the high level is beneficial is also taken into consideration, by comparing the bearer predicted throughput with a throughput threshold. If the bearer predicted throughput does not exceed the throughput threshold, a high level of QoS does not appear to be beneficial, and, then, the QoS level is not increased, thereby avoiding waste of the network resources.

The thresholds used in the procedure illustrated in FIG. 6, are likely different from a bearer to another. The predetermined high value being exceeded by the global predicted throughput triggers a major alarm for the bearer, whose QoS level is then switched to the low level. The predetermined low value being exceeded by the global predicted throughput triggers a minor alarm for the bearer, whose QoS level is then switched from the high level (if the case) to the default level. The threshold X Mbps being exceeded by the bearer predicted throughput indicates that the bearer is overloaded and would then benefit from having the QoS level set to a high level.

The thresholds may be set to reflect a profile of the user at the end of the bearer. Thus, users signing for a higher quality of service (e.g., "gold UEs") may be shielded from being switched to the low level, and may be allowed to maintain the high level for a long time (even indefinite unless the network becomes congested). Conversely, users signing for a lower quality of service (e.g., "bronze UEs") may be proned to easily be switched to the low level, and may be allowed to keep the high level only for a short time.

Figure 7:
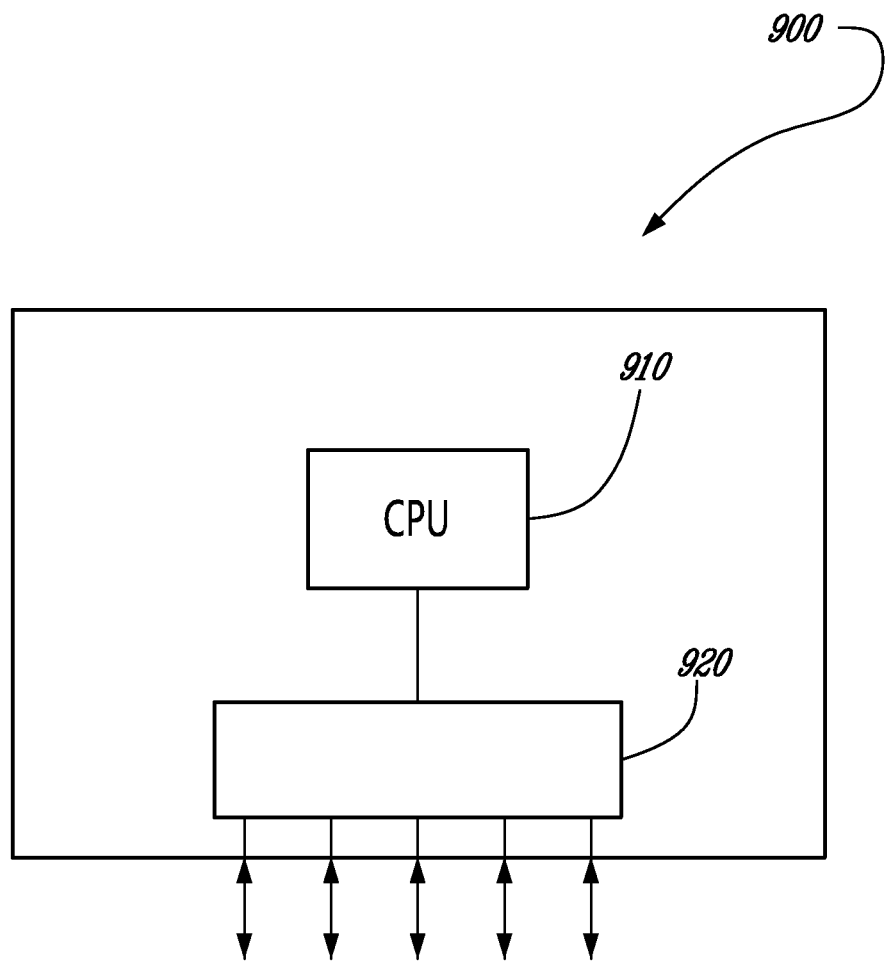
FIG. 7 is a schematic diagram of a network node configured to perform a dynamic adjustment of QoS levels for bearers according to an exemplary embodiment.

In order to perform a method like 500, a central node 900 may have a structure as illustrated in FIG. 7, including an interface 920 and a central processing unit 910. The interface 920 is configured to enable communication in the control plane, to receive the global predicted throughput and the bearer predicted throughputs, to retrieve initial values of the QoS levels and to output updated values of the QoS levels. The central processing unit 910 includes one or more processors and is configured to perform sequentially or in parallel a procedure like the one illustrated in FIG. 6 for the active bearers.

The disclosed exemplary embodiments provide devices, systems and methods capable of a dynamic bearer QoS management based on predicted global and individual throughputs. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a network device, communication systems or as a method performed therein. Accordingly, the exemplary embodiments may take the form of an entirely hardware embodiment or an embodiment combining hardware and software aspects. Further, the exemplary embodiments may take the form of a computer program product (e.g., executable codes) stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A method (500) of dynamically adjusting QoS levels for bearers in a communication system configured to enable users to communicate with a public domain network (PDN), each bearer transporting a subset of packets transmitted from the PDN to users at a specified quality of service (QoS) level among a plurality of QoS levels, the method comprising:
   receiving (510) a global throughput and bearer throughputs corresponding to the bearers;
   individually, for each bearer, determining (520) whether a QoS level associated with the bearer is adequate by comparing the global throughput with threshold values associated to the bearer and on evaluating whether the bearer is overloaded; and
   setting (530) the QoS level associated with the bearer to another level among the plurality of QoS levels, when the determining indicates that the QoS level associated with the bearer is not adequate.

2. The method of claim 1, wherein whether the bearer is overloaded is determined by comparing a bearer throughput of the bearer with a default throughput value associated with the bearer.

3. The method of claim 1 wherein the plurality of QoS level includes at least a default level, a high level and a low level, a throughput allocated to the bearer at the default level being smaller than a throughput allocated to the bearer at the high level, and larger than a throughput allocated to the bearer at the low level.

4. The method of claim 3, wherein the throughput allocated to the bearer at the default level is determined when the bearer is established depending on a user profile of the user at an end of the bearer and a service provided to the user via packets transmitted using the bearer.

5. The method of claim 3, wherein if the global throughput is larger than a predetermined high value, and if the QoS level is different from the low level, then the QoS level is not adequate and is set to the low level.

6. The method of claim 5, wherein if the global throughput is larger than the predetermined high value, the bearer has a major alarm.

7. The method of claim 3, wherein if the global throughput is smaller than a predetermined high value and larger than a predetermined low value, and if the QoS level is the high level, then the QoS level is not adequate and is set to the default level.

8. The method of claim 7, wherein if the global throughput is smaller than the predetermined high value and larger than the predetermined low value, the bearer has a minor alarm.

9. The method of claim 3, wherein if the global throughput is smaller than a predetermined low value, then
   if the QoS level of the bearer is the high level, the bearer is not overloaded, and a first predetermined time has passed since the QoS level has been set to the high level, the QoS level is set to the default level,
   if the QoS level of the bearer is the low level and a second predetermined time has passed since the QoS level has been set to the low level, (i) if the bearer is not overloaded, the QoS level is set to the default level, or (ii) if the bearer is overloaded, the QoS level is set to the high level, and
   if the QoS level of the bearer is the default level and the bearer is overloaded, the QoS level is set to the high level.

10. The method of claim 1, wherein
   whether the bearer is overloaded is determined by comparing a bearer throughput of the bearer with a default throughput value associated with the bearer,
   the plurality of QoS level includes at least a default level, a high level and a low level, a throughput allocated to the bearer at the default level being smaller than a throughput allocated to the bearer at the high level, and larger than a throughput allocated to the bearer at the low level,
   if the global throughput is larger than a predetermined high value, and if the QoS level is different from the low level, then the QoS level is not adequate and is set to the low level,
   if the global throughput is smaller than the predetermined high value and larger than a predetermined low value, and if the QoS level is the high level, then the QoS level is not adequate and is set to the default level, and
   if the global throughput is smaller than the predetermined low value, then
      if the QoS level of the bearer is the high level, the bearer is not overloaded, and a first predetermined time has passed since the QoS level has been set to the high level, the QoS level is set to the default level,
      if the QoS level of the bearer is the low level and a second predetermined time has passed since the QoS level has been set to the low level, (i) if the bearer is not overloaded, the QoS level is set to the default level, or (ii) if the bearer is overloaded, the QoS level is set to the high level, and
      if the QoS level of the bearer is the default level and the bearer is overloaded, the QoS level is set to the high level.

11. The method of claim 1, wherein the global throughput and the bearer throughputs are measured or predicted.

12. A network node (900) configured to dynamically adjust QoS levels for bearers, each bearer transporting a subset of packets transmitted from a public domain network to users, at a specified quality of service (QoS) level among a plurality of quality of service levels, the network node comprising:
   at least one interface (920) configured to receive a global throughput and bearer throughputs, to retrieve specified QoS levels for bearers and to output the specified QoS levels for the bearers; and
   a processing unit (910) configured to perform individually, for each bearer, (i) determining whether a specified QoS level of the bearer is adequate by comparing the global throughput with threshold values associated to the bearer and on evaluating whether the bearer is overloaded, and (ii) setting the specified QoS level associated with the bearer to another level among the plurality of QoS levels if the determining indicates that the specified QoS level associated with the bearer is not adequate.

13. The network node of claim 12, wherein the processing unit is further configured to determine whether the bearer is overloaded by comparing a bearer throughput of the bearer with a default throughput value associated with the bearer.

14. The network node of claim 12, wherein the plurality of QoS level includes at least a default level, a high level and a low level, a throughput allocated to the bearer at the default level being smaller than a throughput allocated to the bearer at the high level, and larger than a throughput allocated to the bearer at the low level.

15. The network node of claim 14, wherein the processing unit is further configured to determine the throughput allocated to the bearer at the default level, when the bearer is established, depending on a user profile of the user at an end of the bearer and a service provided to the user via packets transmitted using the bearer.

16. The network node of claim 14, wherein the processing unit is further configured to determine that the specified QoS is not adequate if the global throughput is larger than a predetermined high value, and the QoS level is different from the low level, and then, to set the QoS level to the low level.

17. The network node of claim 14, wherein the processing unit is further configured to determine that the specified QoS is not adequate if the global throughput is smaller than a predetermined high value but larger than a predetermined low value, and the QoS level is the high level, and then, to set the QoS level to the default level.

18. The network node of claim 14, wherein the processing unit is further configured to determine that the specified QoS level is not adequate if the global throughput is smaller than a predetermined low value, and, then
- if the QoS level of the bearer is the high level, the bearer is not overloaded, and a first predetermined time has passed since the QoS level has been set to the high level, to set the QoS level to the default level,
- if the QoS level of the bearer is the low level and a second predetermined time has passed since the QoS level has been set to the low level, (i) to set the QoS level to the default value if the bearer is not overloaded, or (ii) to set the QoS level to the high level if the bearer is overloaded, and
- if the QoS level of the bearer is the default level and the bearer is overloaded, to set the QoS level the high level.

19. The network node of claim 12, wherein the plurality of QoS level includes at least a default level, a high level and a low level, a throughput allocated to the bearer at the default level being smaller than a throughput allocated to the bearer at the high level, and larger than a throughput allocated to the bearer at the low level, and the processing unit is further configured
- to determine whether the bearer is overloaded by comparing a bearer throughput of the bearer with a default throughput value associated with the bearer,
- to determine that the QoS level is not adequate if the global throughput is larger than a predetermined high value, and then, if the QoS level is different from the low level, to set the QoS level to the low level,
- to determine that the QoS level is not adequate if the global throughput is smaller than the predetermined high value and larger than a predetermined low value, and then, if the QoS level is the high level, to set the QoS level to the default level, and
- to determine that the QoS level is not adequate if the global throughput is smaller than the predetermined low value, and then
  - if the QoS level of the bearer is the high level, the bearer is not overloaded, and a first predetermined time has passed since the QoS level has been set to the high level, to set the QoS level to the default level,
  - if the QoS level of the bearer is the low level, and a second predetermined time has passed since the QoS level has been set to the low level, (i) if the bearer is not overloaded to set the QoS level to the default level, or (ii) if the bearer is overloaded, to set the QoS level to the high level, and
  - if the QoS level of the bearer is the default level and the bearer is overloaded, to set the QoS level to the high level.

20. The network node of claim 12, wherein the processing unit is further configured to perform a policy charging rules function (PCRF).

21. The network node of claim 12, wherein the global throughput and the bearer throughputs are measured or predicted.

* * * * *

UNITED STATES PATENT AND TRADEMARK OFFICE
CERTIFICATE OF CORRECTION

PATENT NO.       : 8,520,523 B2                                          Page 1 of 1
APPLICATION NO.  : 13/025739
DATED            : August 27, 2013
INVENTOR(S)      : De Roucy et al.

It is certified that error appears in the above-identified patent and that said Letters Patent is hereby corrected as shown below:

On Title Page 2, in Item (56), under "OTHER PUBLICATIONS", in Column 1, Line 1, delete "Develpoment" and insert -- Development --, therefor.

In the Drawings

In Fig. 4, Sheet 4 of 7, delete "  " and insert -- *predicted global throughput / *predicted bearer n throughput / S460 Forward informations toward a storage module or a central node in the network --, therefor.

Signed and Sealed this
Twenty-third Day of September, 2014

Michelle K. Lee
*Deputy Director of the United States Patent and Trademark Office*